US011529757B2

United States Patent
Fevre et al.

(10) Patent No.: US 11,529,757 B2
(45) Date of Patent: Dec. 20, 2022

(54) DEVICE FOR GRIPPING A CONTAINER PREFORM, COMPRISING AN EJECTOR ACTING AS A TOOL FOR REMOVING A SPINNER TIP

(71) Applicant: SIDEL PARTICIPATIONS, Octeville-sur-Mer (FR)

(72) Inventors: Sebastien Fevre, Octeville-sur-Mer (FR); Stephane Morin, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 377 days.

(21) Appl. No.: 16/645,457

(22) PCT Filed: Aug. 22, 2018

(86) PCT No.: PCT/EP2018/072682
§ 371 (c)(1),
(2) Date: Mar. 6, 2020

(87) PCT Pub. No.: WO2019/048239
PCT Pub. Date: Mar. 14, 2019

(65) Prior Publication Data
US 2020/0290261 A1    Sep. 17, 2020

(30) Foreign Application Priority Data

Sep. 8, 2017  (FR) ...................................... 1758318

(51) Int. Cl.
*B29C 49/42*      (2006.01)
*B65G 47/90*      (2006.01)
(Continued)

(52) U.S. Cl.
CPC .......... *B29C 49/4205* (2013.01); *B65G 47/90* (2013.01); *B29K 2067/003* (2013.01); *B29L 2031/712* (2013.01)

(58) Field of Classification Search
CPC ........ B29C 49/4205; B29C 2049/2468; B29C 49/42; B29C 49/06; B29C 49/42085;
(Continued)

(56) References Cited

U.S. PATENT DOCUMENTS

| 8,567,589 | B2 * | 10/2013 | Schonberger | ....... B29C 49/4205 198/470.1 |
| 2013/0015040 | A1 * | 1/2013 | Leroux | ............... B29C 49/4205 198/470.1 |
| 2017/0001362 | A1 * | 1/2017 | Le Roux | ................. B29C 49/56 |

FOREIGN PATENT DOCUMENTS

| DE | 102012106245 A1 |   | 2/2014 |   |
| EP | 2976207 | * | 3/2014 | ............. B29C 49/42 |

(Continued)

OTHER PUBLICATIONS

International Search Report dated Sep. 13, 2018.

*Primary Examiner* — Matthew J Daniels
*Assistant Examiner* — Shibin Liang

(57) ABSTRACT

The invention relates to a device for gripping a container preform having a base, a spindle which is mounted on the base, and an ejector at least partially surrounding the spindle. The spinner includes a spindle mounted such that it pivots in a sliding manner in relation to the base and a spinner tip removably fixed to the spindle. The ejector partially surrounds the spinner and is able to occupy a working position in which it is secured to the base. The spinner tip and the ejector are respectively provided with an imprint and a complementary counter-imprint. The ejector can be removed from the base and can occupy a tooling
(Continued)

position in which the counterpart thereof cooperates with the cavity of the spinner tip so that they rotate together.

18 Claims, 7 Drawing Sheets

(51) Int. Cl.
*B29K 67/00* (2006.01)
*B29L 31/00* (2006.01)

(58) Field of Classification Search
CPC .. B29C 49/42087; B65G 47/90; B65G 47/92; B29K 2067/003; B29L 2031/712; F16M 13/00
See application file for complete search history.

(56) References Cited

FOREIGN PATENT DOCUMENTS

| | | |
|---|---|---|
| EP | 2976207 A1 | 1/2016 |
| FR | 2957904 A1 | 9/2011 |
| WO | WO9533616 A1 | 12/1995 |
| WO | WO2014135631 A1 | 9/2014 |
| WO | WO2015181738 A1 | 12/2015 |

\* cited by examiner

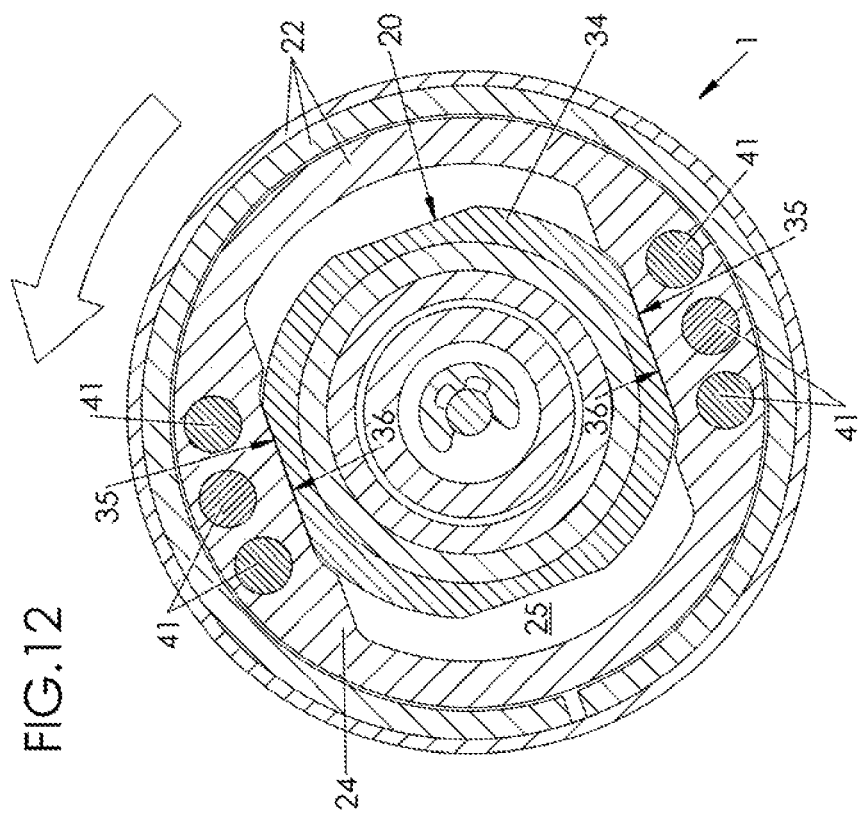
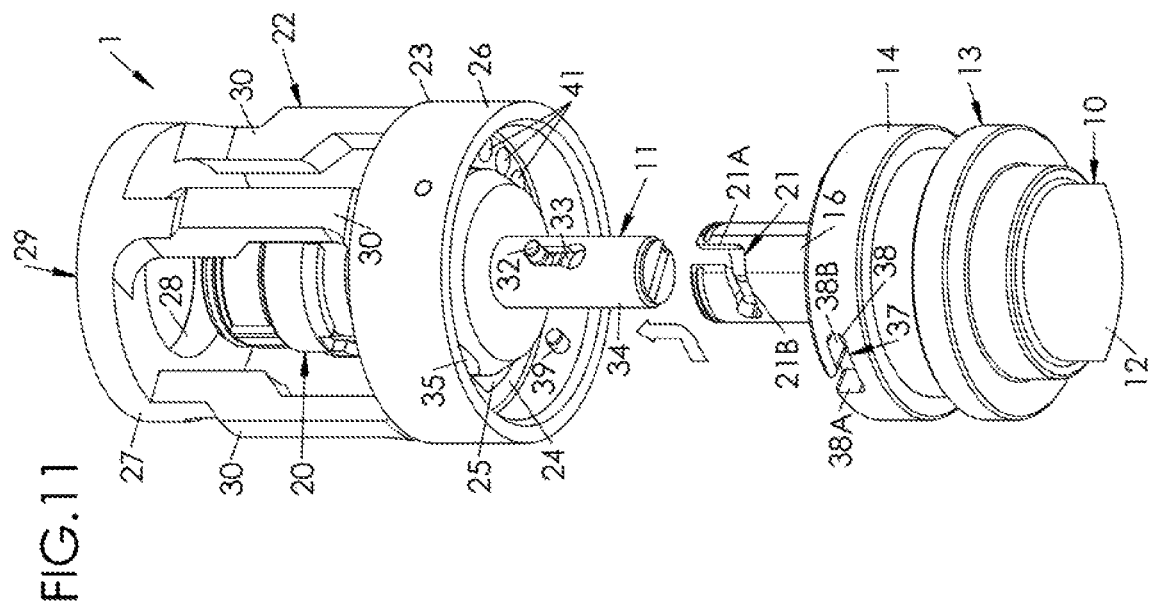

DEVICE FOR GRIPPING A CONTAINER PREFORM, COMPRISING AN EJECTOR ACTING AS A TOOL FOR REMOVING A SPINNER TIP

The invention relates to the transport of container preforms, in particular of plastic material such as polyethylene terephthalate (PET). A preform conventionally comprises a cylindrical body which ends in a hemispherical bottom, an open neck which has its final shape, and in general) a collar separating the neck from the body.

In a container manufacturing facility, the raw injection preforms are usually stored in bulk in a container. The preforms are first taken from the container, oriented and arranged in line to be introduced into a thermal conditioning unit (usually called an "oven") equipped with infrared emitters. In the oven, the preforms are brought to a temperature above their glass transition temperature (which is about 80° C. for PET).

The preforms thus heated are then transferred to a forming unit equipped with a plurality of molds in which the preforms are formed into the shape of the containers by blow molding or stretch blow molding.

In the oven, the preforms are conveyed in single file by means of a transport chain comprising a plurality of links each carrying a gripping device for a preform.

A conventional gripping device is described in European patent EP 0 935 572 (Sidel).

A gripping device usually includes:
a base (integral with a link and which generally takes the form of a sheath);
a mobile unit called a "spinner" which is mounted on the base and includes:
  a spindle mounted so as to slide and pivot relative to the base;
  a spinner tip removably fixed on the spindle;
an ejector which, in a working position, is secured to the base.

In operation, a pinion secured to the spindle meshes with a fixed rack, which, as the chain carrying the link on which the spinner is mounted moves, causes the latter to rotate with the preform, the spinner tip being fitted into the neck of the preform.

Thus, the preform fitted onto the spinner tip is driven both in translation and in rotation in the oven, which allows it to be fully exposed to the radiation of the infrared emitters.

A single installation must be suitable for the manufacture of containers of different models, and in particular of different capacities. A given model of preform may be suitable for several models of containers, but not all. The oven must therefore be able to heat different models of preforms.

Preforms are not only distinguished by the shapes (and sizes) of their body: they sometimes have necks of different diameters.

It is therefore easy to see that it is then necessary to replace each spinner tip with another, of a diameter suited to the new preform model to be heated.

The spinner tip is usually fixed to the spindle by means of a bayonet mount. This bayonet mount is commonly in the form of a groove made in the spindle, into which engages a pin secured to the spinner tip. To remove the spinner tip, the pin must be disengaged from the bayonet mount.

It is however necessary, beforehand, to remove the ejector because it obstructs access to the part of the spinner tip by which the latter is fixed to the spindle. The removal of the ejector and the spinner tip can be automated, as suggested by European patent EP 2 976 207 (Sacmi).

However, the total sequence of operations necessary for removing the ejector remains quite long.

In fact, whether the dismantling of the ejector is automated or not, there is still a need to simplify it. This is the objective of the invention.

To this end, there is proposed, firstly, a device for gripping a container preform, which comprises:
a base;
a spinner which is mounted tin the base and which comprises:
  a spindle mounted so as to slide and pivot relative to the base;
  a spinner tip removably fixed on the spindle, this spinner tip being provided with an imprint;
an ejector at least partially surrounding the spinner, this ejector being:
  able to occupy a working position in which it is secured to the base,
  provided with a counter-imprint complementary to the imprint of the spinner tip,
  able to be removed from the base, and is able to occupy a tooling position in which its counter-imprint cooperates with the imprint of the spinner tip to secure in rotation the ejector and the spinner tip.

Secondly, there is proposed a method of removing, in such a device, the spindle tip from the spindle, which comprises the following operations (which can be carried out by an automated manipulator):
moving the ejector from its working portion to its tooling portion to secure it in rotation with the spinner tip;
imparting, to the ejector, a rotation to separate the spinner tip from the spindle at the bayonet mount.

It can therefore be seen that the ejector serves as a tool for carrying out the removal of the spinner tip. This makes it possible to carry out this removal in a single operation, which combines the withdrawal of the ejector with that of the spinner tip.

Various additional features can be provided, either alone or in combination. Thus, for example:
the spinner tip is fixed to the spindle by means of a bayonet mount.
the imprint and the counter-imprint each consist of one or more facets;
the imprint on the spinner tip is formed by a pair of flats facing away from one another, the counter-imprint on the ejector being formed by a pair of facets facing toward one another;
the device comprises a system for the removable fixing of the ejector on the base;
the removable fixing system comprises a bayonet mount with which a pin cooperates;
the bayonet mount is formed in the base, and the pin is borne by the ejector;
the ejector is mounted on the base with an angular play, between a locked position preventing the ejector from moving in translation relative to the base, and an unlocked position allowing the ejector to move in translation relative to the base:
in the unlocked position of the ejector, each facet of its counter-imprint extends in a manner coplanar with the corresponding flat of the imprint of the spinner tip;
the removable fixing system comprises at least one primary magnet borne by the ejector and a secondary magnet borne by the base, the primary magnet and the secondary magnet being, in the locked position, in line with one another with mutually attracting poles facing one another;

the removable fixing system comprises at least one primary magnet borne by the ejector and a secondary magnet borne by the base, the primary magnet and the secondary magnet being, in the unlocked position, in line with one another with mutually repelling poles facing one another.

Other objects and advantages of the invention will become apparent in the light of the description of an embodiment, given below with reference to the appended drawings, in which:

FIG. 11 is a perspective view of the gripping device, similar to FIG. 10, showing the removal of the spinner tip by means of the ejector;

FIG. 12 is a cross-sectional view of the gripping device of FIG. 11.

FIG. 1 and FIG. 2 show a device 1 for gripping a container preform 2.

Figure 2:
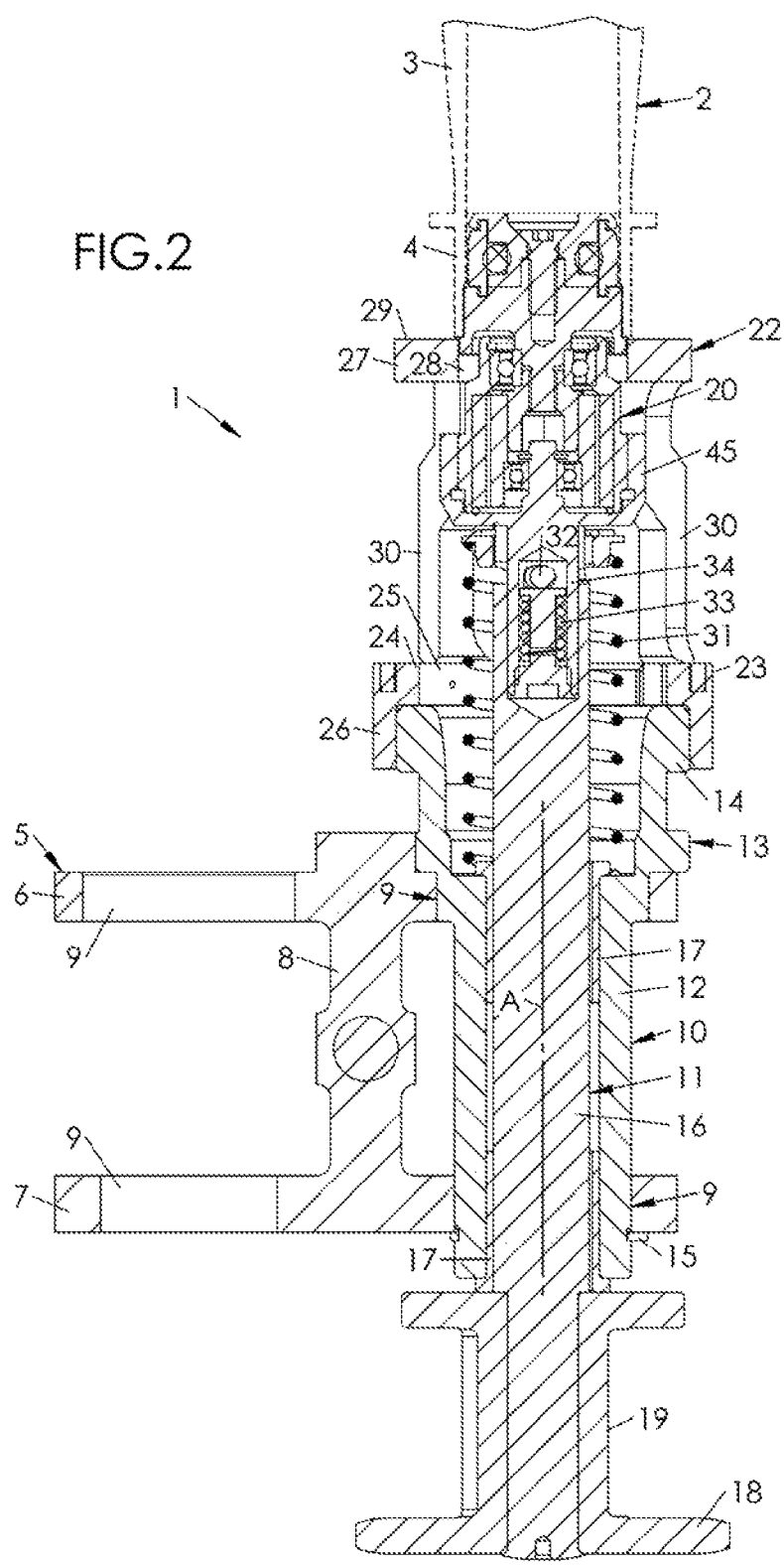
FIG. 2 is a sectional view of the gripping device of FIG. 1, along the plane of section II-II.

The preform 2, partially visible in dotted lines in FIG. 2, comprises, as is usual, a body 3 of substantially cylindrical shape, a neck 4 which opens at a first end of the body 3, and a hemispherical bottom (not visible here for reasons of space) which closes the body 3 at another end, opposite the neck 4. The preform 2 is for example made of PET, although this material is, of little importance in the present context.

Figure 1:
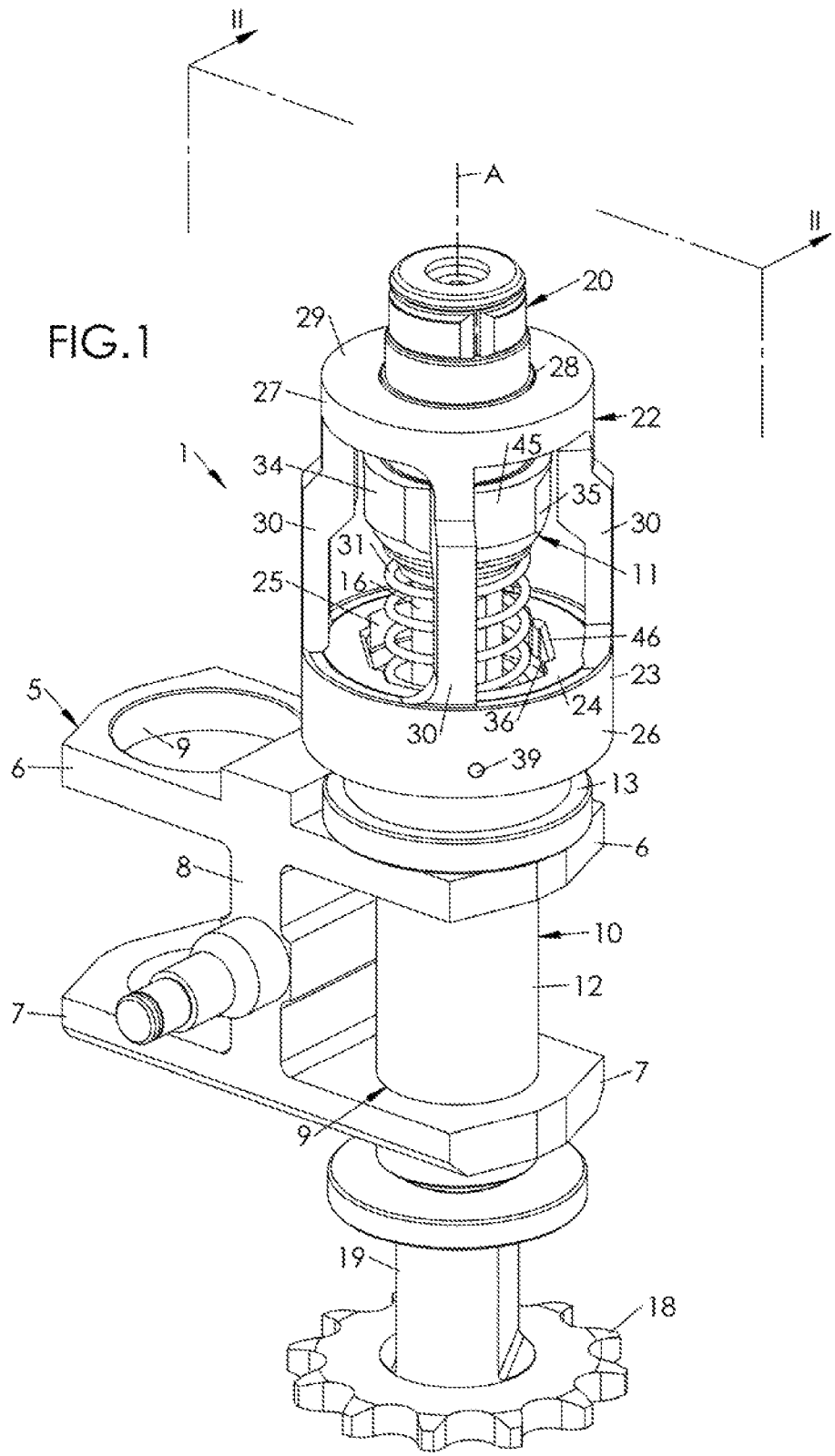
FIG. 1 is a perspective view of a device for gripping a container preform, equipped with a base, a spinner and an ejector.

This device 1 composes a link 5, which, although shown individually in FIG. 1 and in FIG. 2, is in fact integrated into a chain which includes a multitude of such links 5.

The link 5, which is preferably metallic (for example made of steel), comprises two superimposed branches 6, 7 which project laterally from a core 8. The branches 6, 7 have, created in them, coaxial bores 9 which jointly define a main axis A.

The device 1 further includes:
a sheath 10, which is mounted on the link 5 while being fitted into the coaxial bores 9, and
a spinner 11 mounted on this sheath 10 which serves as a base therefor.

According to one embodiment, each link 5 is designed to carry two spinners 11. To this end, and as illustrated in FIG. 1 and FIG. 2, the branches 6, 7 protrude on either side of the core 8 so as to receive two sheaths 10 in each of which there is mounted a spinner 11.

The links 5 are interconnected, for example by means of a coupling mounted articulated on the sheaths 10, so as to allow at least one degree of freedom in rotation (and preferably even two degrees of freedom in rotation) of a link 5 relative to its neighbors.

In FIG. 1 and FIG. 2, for the sake of simplification and clarity, single sheath 10 and a single spinner 11 have been shown.

As can be seen in FIG. 2, the sheath 10 comprises a cylindrical barrel 1 which extends between the two branches 6, 7 and is extended, at one end, by an enlarged head 13 terminated by a collar 14.

The sheath 10 is preferably mounted without play on the link 5. The sheath 10 is immobilized axially relative to the link 5 by the head 13, which is applied against a first branch 6, and by a circlip 16 snapped onto the barrel 12 outside the second branch 7.

The spinner 11 is a movable assembly intended to ensure the gripping of a preform 2 by its neck 4, and is mounted on the link 5 (via the sheath 10) with two degrees of freedom: a translation along the main axis A; a rotation about the main axis A. The structure and movements of the spinner 11 are detailed below.

The spinner 11 comprises, first of all, a spindle 16 mounted so as to slide and pivot relative to the sheath 10, about (and, respectively, along) the main axis A. In the example illustrated, the rotation and the sliding of the spindle 16 relative to the sheath 10 are ensured by plain bearings 17 in the form of bushings, which may be self-lubricated.

As seen in FIG. 1, the spindle 16 bears a pinion 18, which is secured in rotation therewith. The pinion 18 is advantageously formed on a tip 19 in the form of a reel, force-fitted onto the spindle 16.

The spinner 11 comprises, secondly, a spinner tip 20 removably fixed on the spindle 16, in this case by means of a bayonet mount 21 (but it could be another type of fastening system, e.g. with screws).

The gripping device 1 further comprises an ejector 22 which at least partially surrounds the spinner 11. As will be seen, the ejector 22 can occupy several positions.

In a working position, illustrated in FIG. 1 and in FIG. 2, the ejector 22 is mounted on the sheath 10, being secured thereto, both in translation relative to the main axis A, and in rotation about it.

Figure 3:
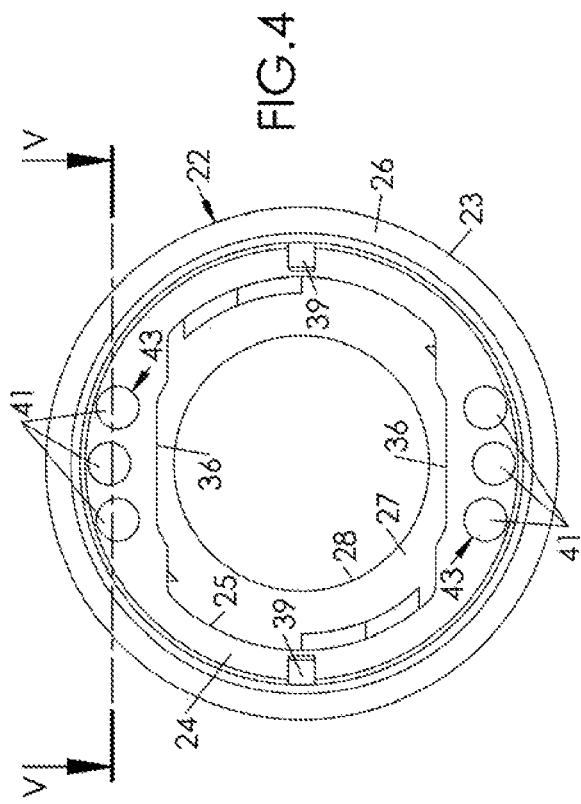
FIG. 3 is a close-up view of the ejector of the gripping device of FIG. 1.
Figure 5:
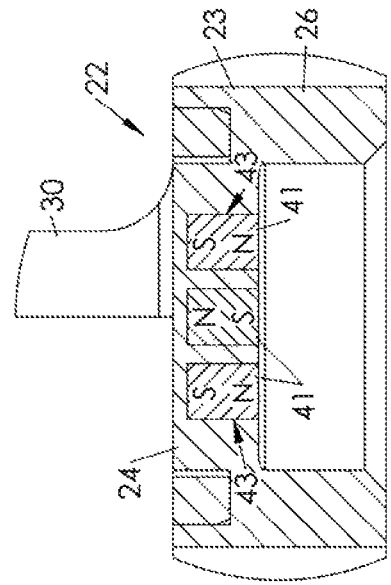
FIG. 5 is a sectional view of the ejector of FIG. 4, along the plane of section V-V.
Figure 4:
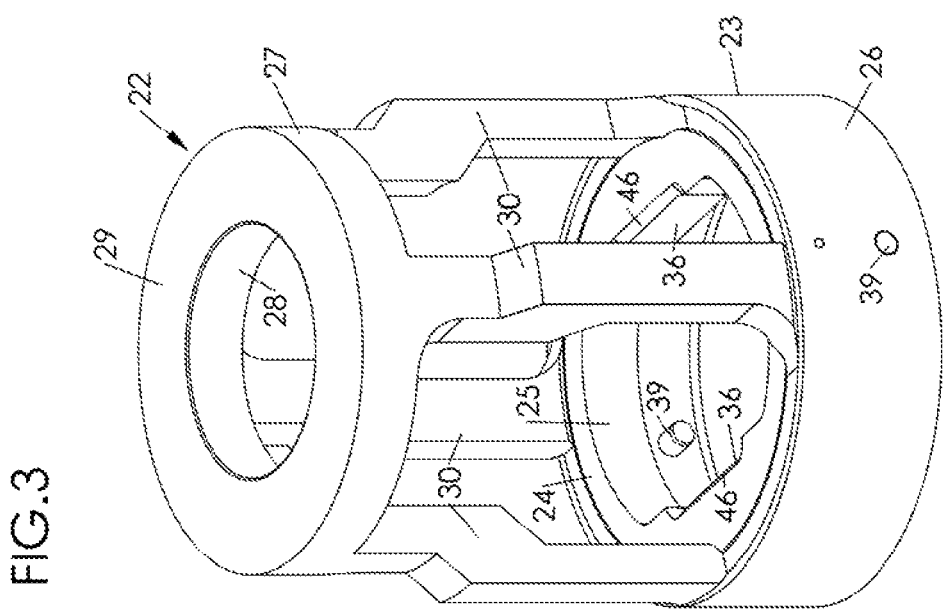
FIG. 4 is a plan view of the ejector of FIG. 3.

The ejector 22, clearly visible in FIG. 3, comprises:
a roughly cylindrical base 23, which includes a disk 24 pierced with a central hole 26, and a skirt 26 which axially extends the disk 24 at its periphery,
a plate 27 in which there is created a central bore 28 and which defines end bearing face 29,
a set of feet 30 (here four in number) which connect the base 23 to the plate 27, and which define openings between them.

In the working position of the ejector 22, its base 23 is fitted onto the sheath 10, the skirt 26 being fitted onto the collar 14.

As we have already mentioned, the spinner 11 is mounted so as to be able to move in translation, relative to the sheath 10 (and to the ejector 22 in its working position), between a deployed position, in which the spinner tip 20 projects from the end bearing face 29 of the ejector 22 (FIG. 1, FIG. 2) so as to fit into the neck 4 of a preform 2 (so-called donning operation), and a retracted position in which the spinner tip 20 is retracted into the ejector 22, below the end bearing face 29 to be extracted from the neck 4 of the preform 2 while the latter abuts against the end bearing face 29 (so-called stripping operation).

The translation of the spinner 11 is controlled by a pusher (not shown) which engages in the nozzle 19 to move the spinner 11 from its deployed position to its retracted position or vice versa, a return spring 31 (made invisible for reasons of clarity in FIG. 10 and FIG. 11) being interposed between the sheath 10 and the spindle 16 to urge the latter permanently towards the deployed position (FIG. 2).

As already mentioned, the fixing of the spinner tip 20 onto the spindle 16 is carried out by means of a bayonet mount 21.

Figure 10:
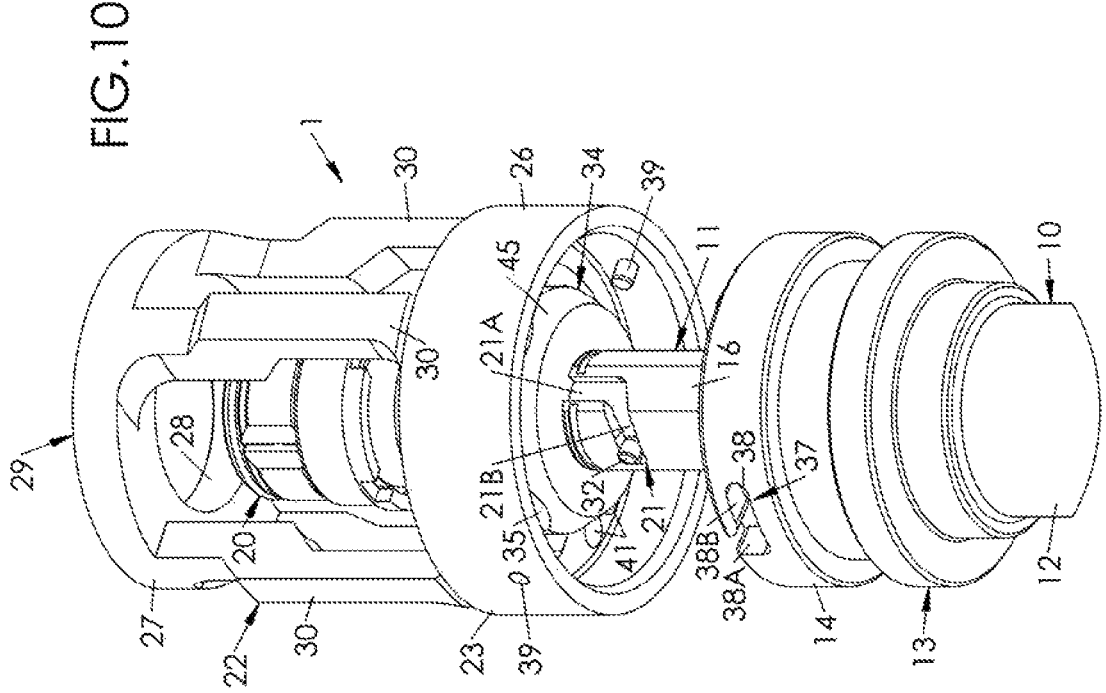
FIG. 10 is a perspective view of the gripping device of FIG. 9, from another viewing angle.

According to an embodiment illustrated in FIG. 10 and FIG. 11, the bayonet mount 21 is formed by a bent groove created at one end of the spindle 16 (opposite the pinion 18). More precisely, this groove comprises an axial section 21A, parallel to the axis A of rotation and opening onto the end of the spindle 16, and a blind transverse section 21B.

Correspondingly, the spinner tip 20 bears a pin 32 which engages in the bayonet mount 21. As illustrated in FIG. 2, the pin 32 is elastically biased by a spring 33 which allows the axial play between the spinner tip 20 and the spindle 16 to be taken up. The spinner tip 20 is immobilized both in translation and in rotation relative to the spindle 16 when the pin 32 is positioned in the notch 21.

In the example illustrated, the spinner tip 20 comprises a connector 84 by which it is fixed to the spindle 16: it is this connector which bears the pin(s) 32.

To withdraw the spinner tip 20 from the spindle 16, it is necessary to immobilize the latter in rotation and to impart to the spinner tip 20 a rotational movement followed by a translational movement, as indicated by the arrow at the center of FIG. 11.

As will be seen, the ejector 22 is used as a tool to carry out the operations removing the spinner tip 20.

To this end, the spinner tip 20 comprises a part formed as a nut, and the ejector 22 comprises a part shaped as a key, complementary to this nut.

In other words, the spinner tip 20 and the ejector 22 are respectively provided with an imprint 35 and a counter-imprint 36 that are complementary. When they cooperate, this imprint 35 and this counter-imprint 36 secure the spinner tip 20 and the ejector 22 in rotation.

Figure 9:
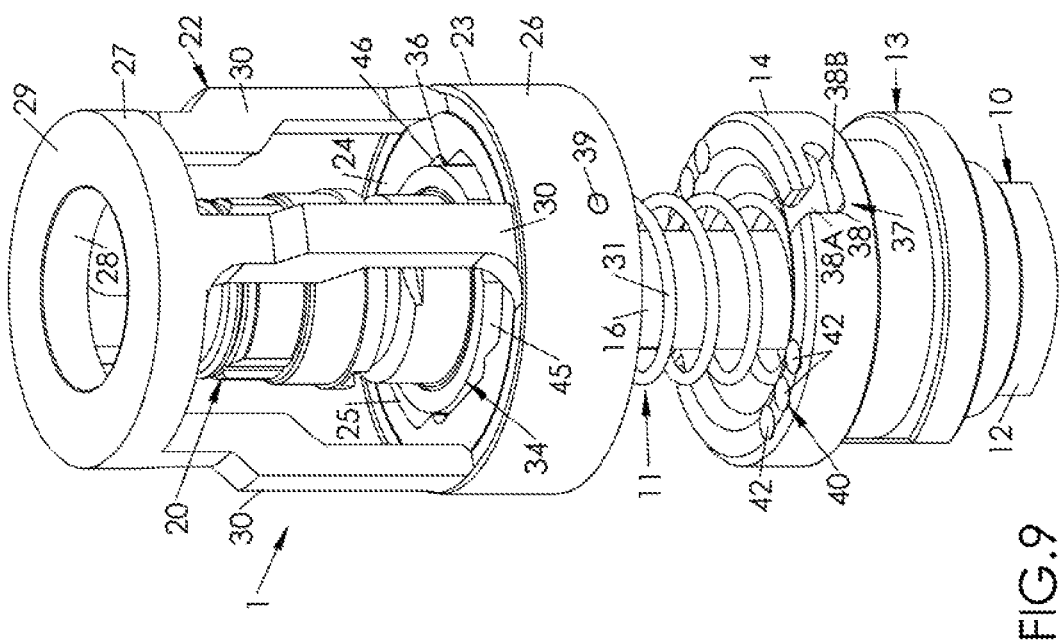
FIG. 9 is a perspective view of the gripping device, similar to FIG. 6, and showing the ejector in its tooling position.

To this end, the ejector 22 can be removed from the sheath 10, in order to be able to occupy a so-called tooling position (FIG. 9, FIG. 10, FIG. 12) in which its counter-imprint 36 cooperates with the imprint 35 of the spinner tip so as to secure in rotation the ejector 22 and the spinner tip 20.

For this, the gripping device 1 comprises a system 37 far the removable fixing of the ejector 22 on the sheath 10.

Figure 6:
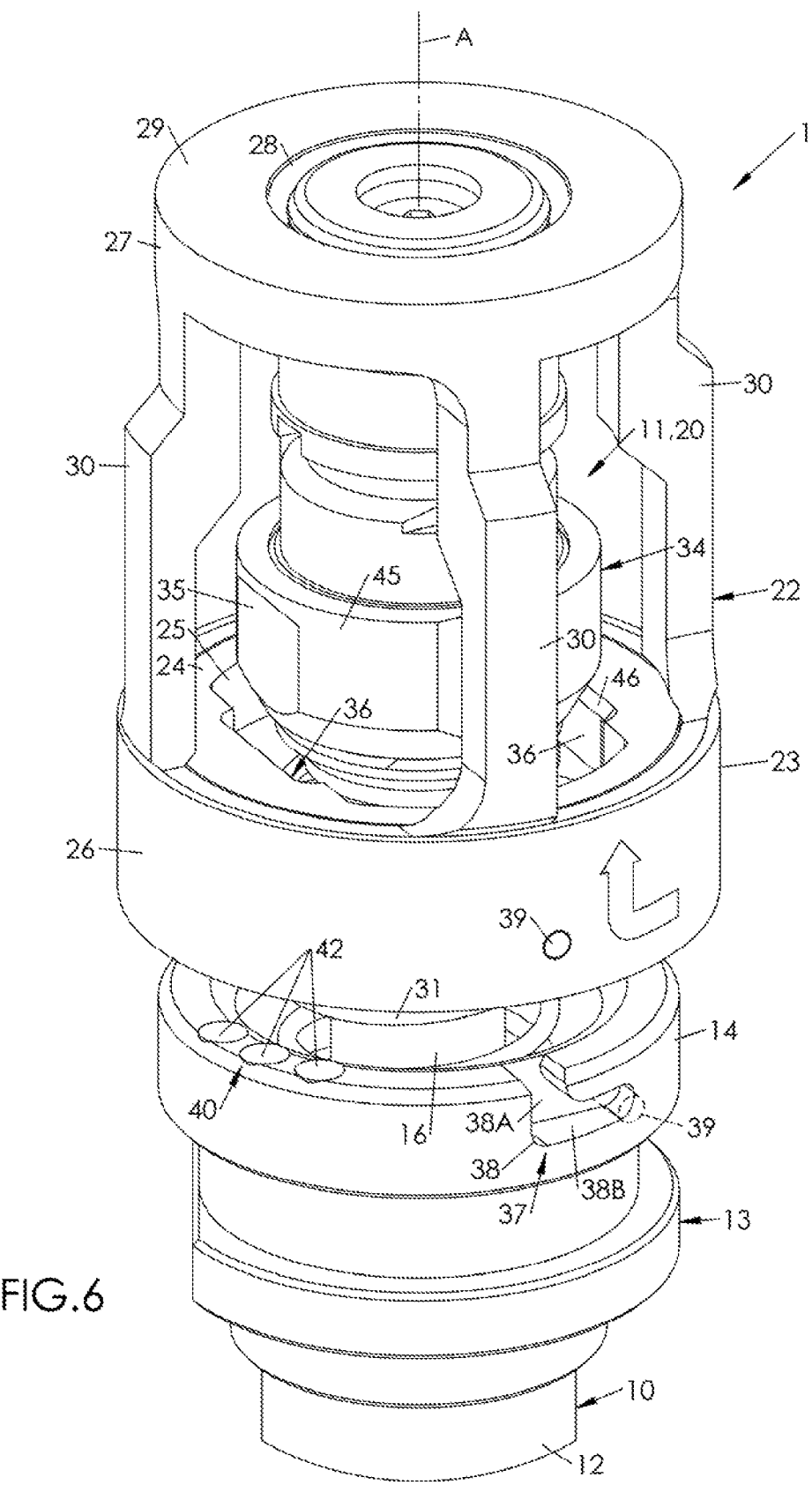
FIG. 6 is a perspective view of the gripping device, illustrating the removal of the ejector.
Figure 7:
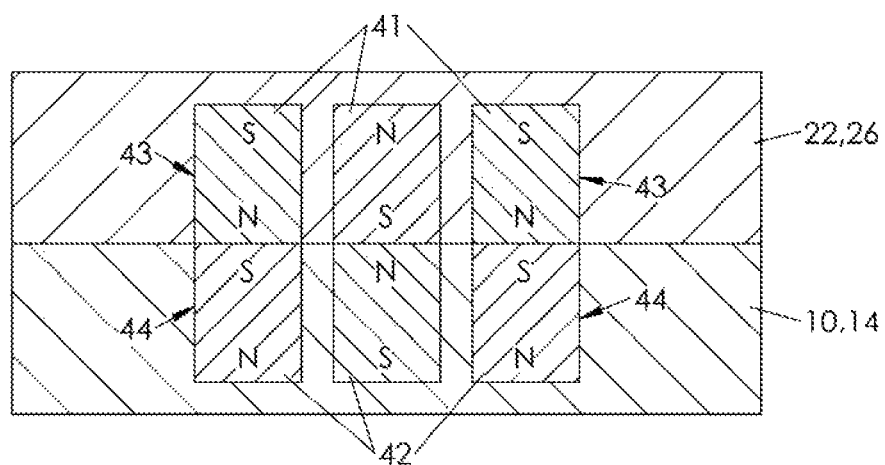
FIG. 7 is a detail view in section in the same plane as FIG. 5, showing the fixing of the ejector on the base.

According to a preferred embodiment illustrated in FIG. 6, this removable fixing system 37 comprises a bayonet mount 38 with which a pin 39 cooperates. In the example illustrated, the bayonet mount 38 is formed in the sheath 10, and the pin borne by the ejector 22.

More specifically, the bayonet mount 38 consists of a bent groove formed in the collar 14, this groove comprising an axial section 38A, parallel to the main axis A and opening onto the end of the sheath 10, and a blind transverse section 38B.

Correspondingly, the ejector 22 bears a pin 39 which projects internally from the skirt 26.

According to an embodiment suggested in FIG. 3, the bayonet mount 38 is double, that is to say that the sheath 10 comprises a pair of identical grooves offset angularly by 180°, while, correspondingly, the ejector 22 comprises two diametrically opposite pins 39.

In order to mount the ejector 22 on the sheath 10, it is brought in axially, taking care to place the pin(s) 39 in line with the straight section 38A of the bayonet mount(s) 38. The ejector 22 is then pushed completely onto the sheath 10, fitting the skirt 26 onto the collar 14, then the ejector 22 is rotated around the main axis A until the pin(s) 39 reach(es) the end of the transverse section 38B of the bayonet mount 38.

In this way, the ejector 22 is mounted on the sheath 10 (which, as we have seen, acts as base for the spinner 11) with an angular play, between:

a locked position (adopted, in the example illustrated, when the pin 39 is at the end of the transverse section 38B of the bayonet mount 38), which blocks the translation of the ejector, 22 relative to the sheath 10, and an unlocked position (adopted, in the example illustrated, when the pin 39 is in line with the axial section 38A of the bayonet mount 38), which allows the translation of the ejector 22 relative to the sheath 10.

According to a preferred embodiment illustrated in FIG. 4 to FIG. 8, the system 37 for removably fixing the ejector 22 includes a magnetic lock 40, which comprises at least one primary magnet 41 (having two opposite poles, respectively N and S) borne by the ejector 22 and one secondary magnet 42 (also having two opposite poles, respectively N and S) borne by the sheath 10.

The magnets 41, 42 are arranged so that, in the locked position of the ejector 22, they are coupled, that is to say located in line (and in contact) with one another with mutually attracting poles (e.g. the N pole of the primary magnet 41 and the S pole of the secondary magnet 42, or the S pole of the primary magnet 41 and the N pole of the secondary magnet 42) facing one another.

In practice, the primary magnet 41 is for example in the form of a magnetic bar or a magnetic pad housed in a complementary opening hole 43 created in the skirt 26 of the ejector 22. As for the secondary magnet 42, it is also present, for example, in the form of a magnetic bar or a magnetic pad housed in a complementary opening hole 44 created in the collar 14 of the sheath 10. The positioning of the holes 43, 44 is chosen so that they are aligned when the elector 22 is placed in its locked position.

The magnets 41, 42 are advantageously of the neodymium-iron-boron (NdFeB) type, which have a high and long-lasting magnetic energy density.

These magnets 41, 42 help maintain the ejector 22 in its locked position, taking into account the large torque that it is necessary to impart to the ejector 22 to misalign the magnets 41, 42 coupled in this manner.

Figure 8:
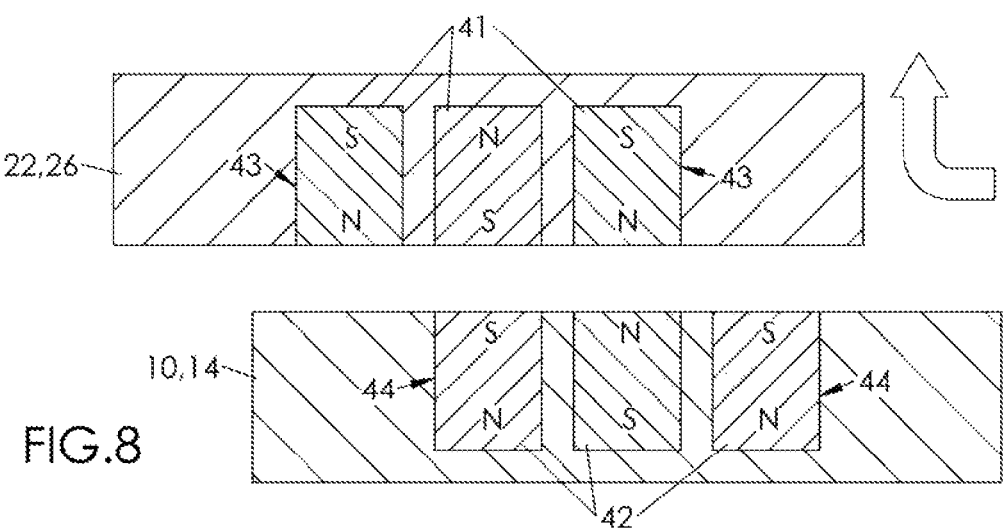
FIG. 8 is a view similar to FIG. 7, illustrating the removal of the ejector.

According to an embodiment illustrated in FIG. 8, the removable fixing, system 37 comprises at least one primary magnet 41 borne by the ejector 22 and one secondary magnet 42 borne by the sheath 10, these being arranged in such a way that the primary magnet 41 and the secondary magnet 42 are, in the unlocked position of the ejector 22, in line with one another with mutually repelling poles (e.g. the N pole of the primary magnet 41 and the N pole of the secondary magnet 42, or the S pole of the primary magnet 41 and the S pole of the secondary magnet 42) facing one another.

In this way, the repelling magnetic forces help to separate the ejector 22 from the sheath 10, which facilitates its disassembly.

In the example illustrated in FIG. 4 to FIG. 8, the magnetic lock 40 comprises several primary magnets 41 (here three in number) borne by the ejector 22, and, correspondingly, several (here also three in number) secondary magnets 42 borne by the sheath 10, which are arranged so that:

in the locked position of the ejector 22 (FIG. 7), each primary magnet 41 is opposite and in contact with a secondary magnet 42 of reverse polarity that is to say that the primary magnet 41 has its S pole at the N pole of the secondary magnet 42, or equivalently the primary magnet 41 has its N pole at the S pole of the secondary magnet 42);

in the unlocked position of the ejector 22, at least one (two in the example illustrated in FIG. 8) primary magnet 41 is opposite a secondary magnet 42 of the same polarity (that is to say that the primary magnet 41 has its S pole at the S pole of the secondary magnet 42, or in an equivalent manner the primary magnet 41 has its N pole at the N pole of the secondary magnet 42).

The multiplicity of magnets 41, 42 increases, in the locked position, the torque necessary for unlocking the ejector 22 and, in the unlocked position, increases the repulsion force exerted by the sheath 10 on the ejector 22, which facilitates withdrawal thereof.

The imprint 35 and the counter-imprint 36 are arranged so as to be aligned when the ejector 22 is in the unlocked position, so an axial pull on the ejector is sufficient to make the counter-imprint 36 cooperate with the imprint 35.

According to one embodiment, the imprint 35 and the counter-imprint 35 are each formed of at least one (and preferably of several) facets.

More specifically, in the example illustrated, the imprint 35 on the spinner tip 20 is formed by a pair of flats facing away from one another, and the counter-imprint 36 on the ejector 22 is formed by a pair of facets facing toward one another.

In the example illustrated in FIG. 6, the flats forming the imprint 35 are borne by a nut-shaped part 45 of the connector 34 of the spinner tip 20, by which the latter is (removably) fixed to the spindle 16.

Furthermore, in the example illustrated, the facets of the counter-imprint 36 are formed by two opposite edges of the central hole 25 created in the disk 24 of the base 23 of the ejector 22. The spacing between the edges of the hole 26 forming the counter-imprint 36 is slightly greater, to allow a clearance necessary for their mutual cooperation, than the spacing between the flats forming the imprint 35. However, this clearance is too small to be visible in FIG. 12.

As illustrated in FIG. 6, each facet of the counter-imprint 36 is advantageously bordered by a chamfer 46 intended to make it easier for the counter-imprint 36 of the ejector 22 to fit over the imprint 35 of the spinner tip 20.

To remove the spinner tip 20 from the spindle 16, the following operations are carried out starting from the configuration (illustrated in FIG. 1 and FIG. 2) in which the spinner tip 20 is fixed to the spindle 16 and the ejector 22 is in its working position, locked on the sheath 10:

moving the ejector 22 from its working position to its tooling position to secure it in rotation with the spinner tip 20, then imparting, to the ejector 22, a rotation to separate the spinner tip 20 from the spindle 16 at the bayonet mount 21.

In the example illustrated, to move the ejector 22 from its working position to its tooling position, the ejector 22 is firstly moved from its locked position (in which it is possibly held by the magnetic lock 40) to its unlocked position.

In the unlocked position of the ejector 22, each facet of its counter-imprint 36 extends in a manner coplanar with the corresponding flat of the imprint 35 of the spinner tip 20.

Then all that is required is to slide the ejector 22 to fit the facets of the counter-imprint 36 onto the corresponding flats of the imprint 35, that is to say to make the counter-imprint 36 cooperate with the imprint 35. In this tooling position, any rotation imparted to the ejector 22 (in the only direction allowed by the bayonet mount 21) is transmitted to the spinner tip 20.

It should be noted that these operations can be carried out by an automated manipulator, provided with a suitable tool making it possible to grasp the ejector 22 to impart to the latter the above-mentioned rotational and translational movements.

The ejector 22 and the spinner tip 20 are thus removed from a block, respectively from the sheath 10 and from the spindle 16, which remain on the link 5.

The ejector 22 and the spinner tip 20, which remain coupled, are for example stored in a store, and another ejector 22-spinner tip 20 couple is taken therefrom to be mounted, by a procedure which is the reverse of the removal described above, on the spindle 16 and the sheath 10 previously stripped by the previous disassembly procedure.

It is clear that the use of the ejector 22 as a tool serving for removal (or, conversely, re-mounting) of the spinner tip 20 makes it possible to simplify—and to accelerate—the replacement thereof, since its removal is carried out in a single operation—including, of course, several combined movements of rotation and translation. The replacement of the spinner tip 20 can easily be automated, which has the benefit of optimizing production, downtime being minimized.

The invention claimed is:

1. A device (1) for gripping a container preform, which comprises:
    a base (10);
    a spinner (11) which is mounted on the base (10) and which comprises:
        a spindle (16) mounted so as to slide and pivot relative to the base (10);
        a spinner tip (20) removably fixed on the spindle (16);
        an ejector (22) at least partially surrounding the spinner (11), this ejector (22) being able t occupy a working position in which it is secured to the base (10);
    wherein:
        the spinner tip (20) and the ejector (22) are respectively provided with an imprint (35) and a counter-imprint (36) that are complementary,
        the ejector (22) can be removed from the base (10), and is able to occupy a tooling position in which the counter-imprint (36) of the elector (22) cooperates with the imprint (35) of the spinner tip (20) to secure in rotation the ejector (22) and the spinner tip (20).

2. The device (1) as claimed in claim 1, wherein the spinner tip (20) is mounted fixed on the spindle (16) by means of a bayonet mount (21).

3. The device (1) as claimed in claim 2 wherein the imprint (35) and the counter-imprint (36) are each formed from one or more facets.

4. The device (1) as claimed in claim 2, wherein the device (1) comprises a system (37) for removable fixing of the ejector (22) on the base (10).

5. The device (1) as claimed in claim 1, wherein the imprint (35) and the counter-imprint (36) are each formed from one or more facets.

6. The device (1) as claimed in claim 5, wherein the imprint (35) on the spinner tip (20) is formed by at least one pair of flats facing away from one another, the counter-imprint (36) on the ejector 22) being formed by at least one pair of facets facing toward one another.

7. The device (1) as claimed in claim 1, wherein the device (1) comprises a system (37) for removable fixing of the ejector (22) on the base (10).

8. The device (1) as claimed in claim 7, wherein the ejector (22) is mounted on the base with an angular play, between a locked position preventing the ejector (22) from moving in translation relative to the base (10), and an unlocked position allowing the ejector (22) to move in translation relative to the base (10).

9. The device (1) as claimed in claim 7, wherein the removable fixing system (37) comprises a bayonet mount (38) with which a pin (39) cooperates.

10. The fixing device (1) as claimed in claim 9, wherein the bayonet mount (38) is formed in the base (10), and the pin (39) is borne by the ejector (22).

11. The device (1) as claimed in claim 9, wherein the ejector (22) is mounted on the base with an angular play, between a locked position preventing the ejector (22) from moving in translation relative to the base (10), and an unlocked position allowing the ejector (22) to move in translation relative to the base (10).

12. The device (1) as claimed in claim 10, wherein the ejector (22) is mounted on the base with an angular play, between a locked position preventing the ejector (22) from moving in translation relative to the base (10), and an unlocked position allowing the ejector (22) to move in translation relative to the base (10).

13. The device (1) as claimed in, claim 8, wherein:
the imprint (35) and the counter-imprint (36) are each formed from one or more facets, and
in the unlocked position of the ejector (22), each facet of its counter-imprint (36) extends in a manner coplanar with the corresponding flat of the imprint (35) of the spinner tip (20).

14. The device (1) as claimed in claim 8, wherein the removable fixing system (37) comprises at least one primary magnet (41) borne by the ejector (22) and one secondary magnet (42) borne by the base (10), the primary magnet (41) and the secondary magnet (42) being, in the locked position, in line with one another with mutually attracting poles facing one another.

15. The device (1) claimed in claim 8, wherein the removable fixing system (37) comprises at least one primary magnet (41) borne by the ejector (22) and one secondary magnet (42) borne by the base (10), the primary magnet (41) and the secondary magnet (42) being, in the unlocked position, in line with one another with mutually repelling poles facing one another.

16. The device (1) as claimed in claim 8, wherein:
the imprint (35) on the spinner tip (20) is formed by at least one pair of flats facing, away from one another, the counter-imprint (36) on the ejector (22) being formed by at least one pair of facets facing toward one another, and
in the unlocked position of the ejector (22), each facet of its counter-imprint (36) extends in a manner coplanar with the corresponding flat of the imprint (35) of the spinner tip (20).

17. The device (1) s claimed in claim 13, wherein the removable fixing system (37) comprises at least one primary magnet (41) borne by the ejector (22) and one secondary magnet (42) borne by the base (10), the primary magnet (41) and the secondary magnet (42) being, in the locked position, in line with one another with mutually attracting poles facing one another.

18. The device (1) as claimed in claim 13, wherein the removable fixing system (37) comprises at least one primary magnet (41) borne by the ejector (22) and one secondary magnet (42) borne by the base (10), the primary magnet (41) and the secondary magnet (42) being, in the unlocked position, in line with one another with mutually repelling poles facing one another.

\* \* \* \* \*